United States Patent Office 2,850,491
Patented Sept. 2, 1958

2,850,491
PEPTIDE DERIVATIVES AND PROCESS FOR THEIR MANUFACTURE

Max Brenner, Riehen, Switzerland, assignor to Ciba Pharmaceutical Products, Inc., Summit, N. J.

No Drawing. Application July 2, 1956
Serial No. 595,080

Claims priority, application Switzerland July 5, 1955

13 Claims. (Cl. 260—112)

The present invention relates to a new process for the manufacture of peptides by a rearrangement.

All the processes for the manufacture of peptides known up to the present comprise successively linking together carboxyl and amino groups, the peptide linkage being formed according to one or other of the following types of reaction:

(a) The reactive acid derivative of an amino acid protected at the nitrogen reacts with the free amino group of a second acid or advantageously with its ester:

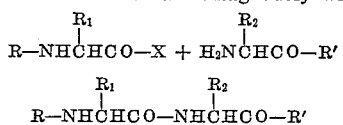

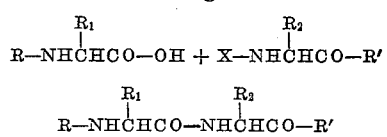

(b) An N-substituted amino acid reacts with a derivative activated at the nitrogen of a second amino acid:

$$R-NH\overset{R_1}{\underset{|}{C}}HCO-OH + X-NH\overset{R_2}{\underset{|}{C}}HCO-R'$$

$$R-NH\overset{R_1}{\underset{|}{C}}HCO-NH\overset{R_2}{\underset{|}{C}}HCO-R'$$

A survey of the possible variants of these types of reaction can be found, for example, in the summary of Th. Wieland, Angewandte Chemie 66, 507 (1954).

The more recent syntheses of peptides in which the coupling of an N-substituted amino acid with an amino acid ester takes place directly (cf. for example J. C. Sheehan, Journal of the American Chemical Society 77, 1067 (1955) and 78, 1367 (1956) intermediately follow the course of one of the above types of reaction too.

Although the possibilities which have been known for a long time and those which have been discovered recently for the manufacture of peptides have led to good results, deficiencies have cropped up again and again owing to the principle of successively linking together carboxyl and amino groups. The drawbacks are particularly apparent in the manufacture of higher peptides; if, for example, the dipeptide derivatives I and II formed at a first stage $$R-NH\overset{R_1}{\underset{|}{C}}HCO-NH\overset{R_2}{\underset{|}{C}}HCO-R'$$
I $$R-NH\overset{R_3}{\underset{|}{C}}HCO-NH\overset{R_4}{\underset{|}{C}}HCO-R'$$
II are to be linked to a tetrapeptide in a second stage, at least one N-substituent R and one ester group R' must be split off before the linkage to the tetrapeptide derivatives III or IV can be effected.

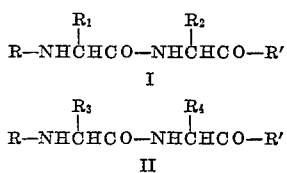

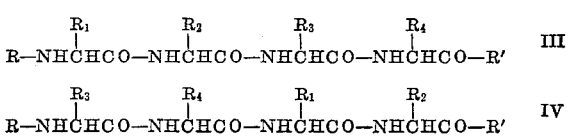

In the same way in the successive extension of a peptide chain by one amino acid each time, it is necessary at each step to remeove an N-substituent or to split an ester group before an additional peptide bond can be formed.

The literature abounds in examples in which the splitting off of N-subsituents or of ester groups has led to complications which could only be overcome in a roundabout way. The need for a fundamentally new synthesis of peptides has therefore long made itself felt.

The new process for the manufacture of peptides by a rearrangement consists in treating an amino acid derivative or a peptide derivative having at the amino end an acyl residue of the Formula V

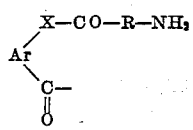     V in which Ar represents an at most dinuclear residue of a compound of aromatic character in which the two substituents are in ortho-position, and in which X stands for an oxygen or sulphur atom and R for the divalent residue of an α-amino-carboxylic acid, particularly of a natural amino acid, or a salt of these compounds, with a basic agent.

The residue

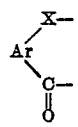

represents according to the above definition the residue of an ortho-hydroxy- or ortho-mercapto-carboxylic acid, such as for example of salicylic acid or of thiosalicylic acid. R represents more particularly the radical of the formula

in which R' stands for hydrogen or an organic residue, especially the residue of a side chain present in a natural amino acid.

In the course of the rearrangement of the above compounds the residue —CO—R—NH₂ is disconnected from X, turned 180° and inserted between the group

and the amino acid or peptide residue originally linked with it, whereby peptides of the following general Formula VI are formed.

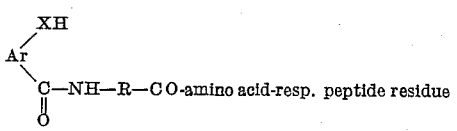

The mechanism of the transposition can be illustrated by the following diagram—for example in the case of the synthesis of salicoyl-alanyl-glycine-methyl ester:

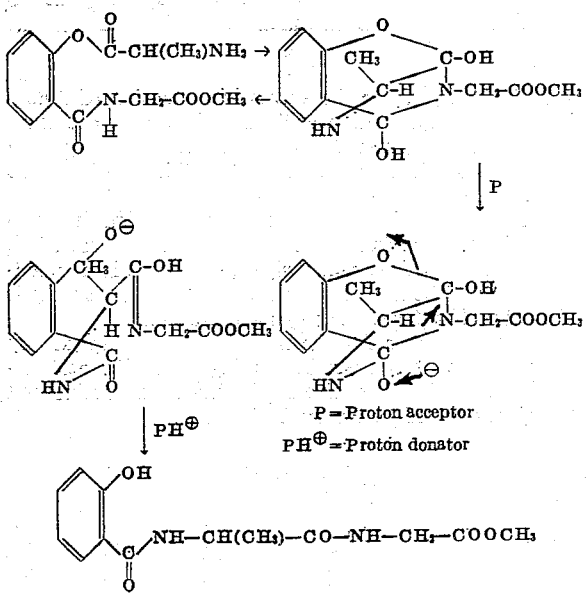

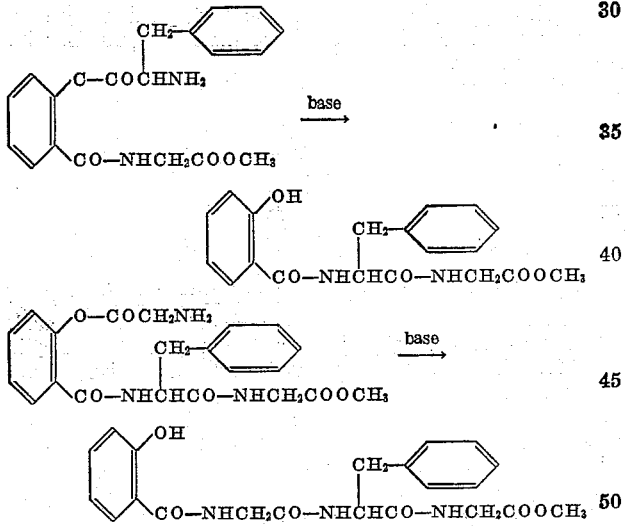

By repeating the rearrangement several times peptide chains can be built up, for example corresponding to the following diagram:

As the above reaction diagram shows, the amino acid to be added is inserted at every step between the acyl group and the amino acid residue or peptide residue linked with it. According to the new process it is therefore possible to keep the same N-substituent and the same ester group throughout all the reaction steps in the building up of a peptide chain. This represents a big step forward compared with all known syntheses of peptides in which at each reaction step an N-substituent and/or an ester group must be split off as described above.

In the reaction according to the present process there can be used as basic agent inorganic bases, such as alkali-hydrogen carbonate, alkali carbonate or alkali hydroxide, or organic bases, particularly tertiary organic bases, such as for example triethylamine, tributylamine, N-alkyl-piperidine or pyridine. If necessary, the original basicity of the starting material suffices to initiate the rearrangement.

If an inorganic base is used, the reaction is advantageously carried out in a solvent containing hydroxyl, for example in water, alcohols or phenols; when using an organic base a hydroxyl-free solvent, such as chloroform, dioxane, tetrahydrofurane, dimethyl-formamide is preferable.

The reaction temperature can vary within a wide range. It is advantageous to work at a temperature of 25° C. or below.

A great advantage of this process consists in no racemization of optically active amino acid residue occurring under the mild conditions under which the rearrangement takes place.

The N-acyl group of the N-acylated peptides obtained in the rearrangement according to the invention can be split off, if desired after hydrolytic cleavage of any ester groups present and/or etherification of the groups —XH, for example by treatment with sodium in liquid ammonia, the corresponding free peptides being formed. The substances obtainable according to the process can therefore be used, for example, as intermediate products for the manufacture of natural peptides, and of peptides having a therapeutic or antibacterial effect, or of peptides with a hormone effect.

The amino acid derivatives or peptide derivatives used as starting materials which are substituted at the amino end by an acyl residue of the Formula V can be obtained, for example, by hydrogenation of the corresponding azido compounds having an acyl residue of the Formula VII, or by decarbobenzoxylation of the corresponding carbobenzoxy compounds having an acyl residue of the Formula VIII.

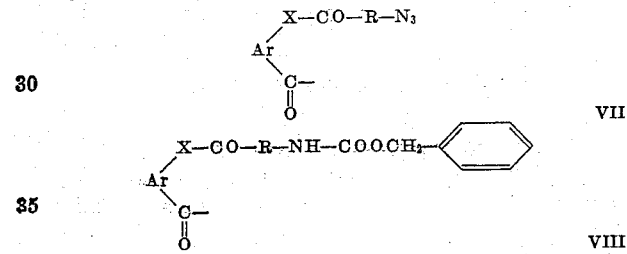

By carefully subjecting an amino acid derivative or peptide derivative, which are substituted by an acyl residue of the Formula VIII (see above), to the action of alkali, urea derivatives are formed, for example from the O-(carbobenzoxy-DL-phenyl-alanyl)-salicoyl-glycine-methyl ester IX the urea X:

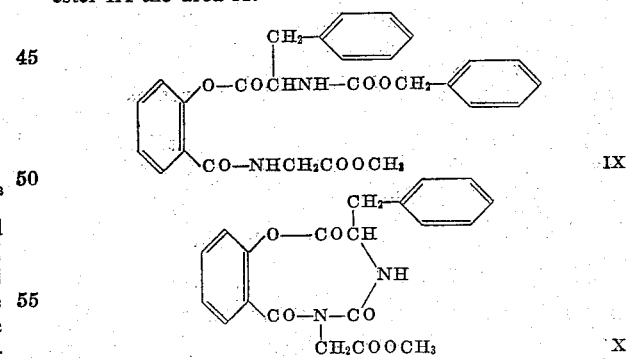

From urea derivatives of this type there are formed with further alkaline treatment the amino acid derivatives or peptide derivatives substituted by an acyl residue of the Formula V and described as starting materials for the present process which can be rearranged in an alkaline medium directly into the reaction products of the invention. The invention is illustrated but in no way limited by the following examples.

EXAMPLE 1

1.5 grams of perchlorate of O-(DL-phenyl-alanyl)-salicoyl-glycine-methyl ester of the formula

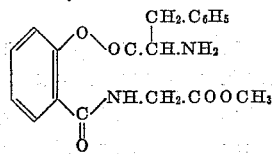

are dissolved in 50 cc. of absolute tetrahydrofuran. This solution is added to a 2 N-solution of triethylamine in 150 cc. of methanol cooled to −5° C., the whole is stirred for one hour at room temperature, evaporated to dryness under reduced pressure, distributed between ethyl acetate and 2 N-hydrochloric acid, separated, washed with potassium hydrogen carbonate of 10% strength and water, dried and, after evaporating the ethyl acetate, there are obtained 1.12 grams (95% of the theoretical yield) of crystalline salicoyl-DL-phenyl alanyl-glycine-methyl ester of the formula

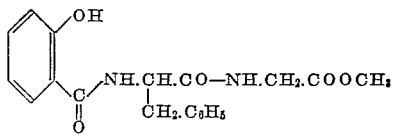

The substance melts in a crude state at 159–164° C., after crystallization from methanol and water at 165–166° C.

The perchlorate used as starting material can be prepared as follows:

2.9 grams of salicoyl-glycine (Bondi S., Z. Physiol. Chem. 52, 172, 1907) are treated in 100 cc. of methanol at 0° C. with hydrochloric acid gas and the solution is allowed to stand overnight. After evaporating the methanol, the oily residue is distributed between bicarbonate and ethyl acetate, the ethyl acetate solution is dried and evaporated to dryness under reduced pressure. By recrystallization from a little methanol and water or from benzene there is obtained salicoyl-glycine-methyl ester melting at 79° C. Yield 86%.

Carbobenzoxy-DL-phenyl alanyl chloride (cf. Bergmann et al., Z. Physiol. Chem. 224, 33 (1939)) from 3 grams (10 millimols) of carbobenzoxy-DL-phenyl-alanine is suspended in 25 cc. of absolute ether and cooled to −70° C. A mixture of 10 cc. of pyridine and 1.4 cc. (10 millimols) of triethylamine previously cooled to −15° C. is added dropwise, while stirring briskly, so that the temperature does not exceed −60° C.

A solution of 1.2 grams (5.7 millimols) of salicoyl-glycine-methyl ester in 30 cc. of absolute ether is added dropwise at −70° C. while stirring briskly. A fine white precipitate separates from the reaction mixture. The mixture is heated to −15° C. and allowed to stand overnight at that temperature. From the mixture, which has turned orange-yellow, ether and pyridine are evaporated under reduced pressure at 35° C. bath temperature and the residue is distributed between 2 N-hydrochloric acid and ethyl acetate. The residue is then washed with 2 N-hydrochloric acid, KHCO₃-solution of 10% strength, then alternately with 2 N-sodium carbonate and water, and finally with water, dried over sodium sulfate and evaporated under reduced pressure. 2.39 grams of a yellowish oily residue remain from which under ether 1.9 grams (64% of the theoretical yield) of colourless O - (carbobenzoxy - DL - phenyl - alanyl) - salicoyl-glycine-methyl ester crystallizes. For the purpose of purification the product is recrystallized from a mixture of methanol and water. Melting point=124–124.5° C.

1.5 grams (3.1 millimols) of O-(carbobenzoxy-DL-phenyl alanyl)-salicoyl-glycine-methyl ester are dissolved in 50 cc. of glacial acetic acid, 3.1 cc. of 1 N-HClO₄ in glacial acetic acid and 1 gram of palladium carbon of 10% strength are added and hydrogen is passed through at room temperature. After 30 minutes there is no more CO₂ detectable with barium hydroxide solution in the escaping gas. The palladium carbon is then filtered off, washed with glacial acetic acid and the filtrate evaporated under reduced pressure at 40° C. The glassy colourless residue is taken up in tetrahydrofuran and about three times the quantity of benzene is added, whereupon O-(DL-phenyl alanyl)-salicoyl-glycine-methyl ester perchlorate begins to crystallize after scratching with a glass rod. There are obtained 1.15 grams (80% of the theoretical yield) melting at 161–164° C. The product is recrystallized from a mixture of tetrahydrofuran and benzene for the purpose of analysis. Melting point 162–165° C. (with decomposition). Further recrystallization leads to lowering of the melting point.

EXAMPLE 2

A solution of 5 grams of O-(carbobenzoxy-DL-phenyl-alanyl)-salicoyl-glycine-methyl ester of the formula

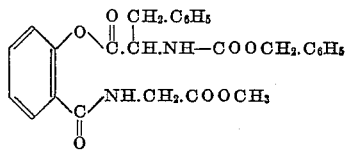

in 200 cc. of absolute glacial acetic acid and 10 cc. of 1 N-perchloric acid in acetic acid is agitated in a hydrogen atmosphere in the presence of 5 grams of palladium carbon of 10% strength until CO₂ is no longer formed. The mixture is evaporated to dryness at 40° C. bath temperature, dissolved in 200 cc. of absolute tetrahydrofuran and the solution is run into 400 cc. of a 2 N-solution of triethylamine in absolute methanol cooled to −5° C. Working up as described in Example 1 yields 3 grams (85% of the theoretical yield) of crystalline salicoyl-dipeptide ester of the formula given in Example 1.

EXAMPLE 3

1 gram of O-(carbobenzoxy-DL-phenyl alanyl)-salicoyl-glycine-methyl ester (preparation and formula cf. Examples 1 and 2) in 20 cc. of methyl-Cellosolve is subjected to hydrogenolysis in the presence of 10 equivalents of triethylamine. Palladium carbon is used as catalyst. After evaporating and working up as described in Example 1 there is obtained the expected salicoyl-dipeptide ester melting at 165° C. Its formula is given in Example 1.

EXAMPLE 4

1 gram of urea derivative of the formula

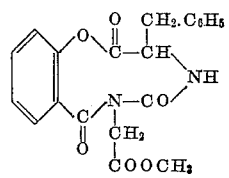

is dissolved in 75 cc. of acetone, 75 cc. of 10 N-caustic soda solution is added to the solution and the whole allowed to stand overnight at room temperature. The pH drops to 7 and the ferric chloride reaction on phenolic hydroxyl becomes positive. The mixture is acidified, taken up in ethyl acetate, and the organic phase is washed with 2 N-hydrochloric acid, exhaustively extracted alternately with 10% potassium hydrogen carbonate and water, and from the bicarbonate-water extract there is obtained in the customary manner 0.86 gram (97% of the theoretical yield) of an initially oily acid which when a drop of ether is added and scratched with a glass crystallizes and then melts at 210–211° C. It has the following formula

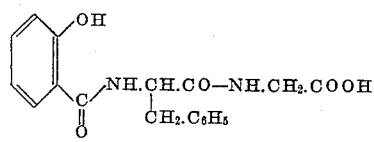

The urea derivative used as starting material can be prepared as follows:

The solution of 2.8 grams (5.7 millimols) of O-(carbobenzoxy-DL-phenyl alanyl)-salicoyl-glycine-methyl ester in 100 cc. of ethyl acetate is agitated for a short time with 20 cc. of ice-cold 2 N-NaOH. In addition to acid hydrolysis products, the urea derivative is formed, remaining as a neutral substance in the ethyl acetate. After washing the ethyl acetate solution neutral, drying and evaporating, 1.1 grams of oily residue are obtained which are taken up in acetone. On the addition of ether there crystallize on scratching with a glass rod 670 mg. (30%) of the colourless above mentioned urea derivative melting at 158–159° C. The yields are not reproducible and fluctuate between 20 and 40%. For the purpose of purification and analysis the urea is recrystallized from a mixture of acetone and ether. Plates melting at 158.5–160° C.

EXAMPLE 5

1 gram of the perchlorate of O-(L-phenyl-alanyl)-salicoyl-glycine-methyl ester (formula cf. Example 1) is dissolved in 100 cc. of a 2 N-solution of triethylamine in absolute chloroform at room temperature. The mixture is allowed to stand for two hours, evaporated to dryness under reduced pressure, worked up according to Example 1 and there is obtained quantitatively salicoyl-L-phenyl alanyl-glycine-methyl ester (formula as in Example 1) melting at 70.5–71.5° and having the specific rotation $[\alpha]_D^{24°} = -54.7° \pm 1°$ (c. = 1 in dioxane).

The perchlorate used as starting material can be prepared according to the process described for the DL-form in Example 1. O-(carbobenzoxy-L-phenyl alanyl)-salicoyl-glycine-methyl ester: crystals from a mixture of ethyl acetate and petroleum ether melting at 109° C.; yield 78%. O-(L-phenyl alanyl)-salicoyl-glycine-methyl-ester perchlorate, crystals from tetrahydrofuran and a little petroleum ether melting at 175–179° C. (with decomposition); yield 65%.

EXAMPLE 6

3.5 grams of the perchlorate of O-(glycyl)-salicoyl-L-phenyl alanine-methyl ester of the formula

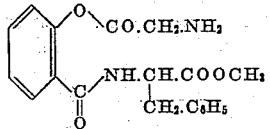

are mixed with 350 cc. of a 2 N-solution of triethylamine in absolute chloroform. The mixture is allowed to stand for 2 hours at 25° C., is worked up as described in Example 1 and, after crystallization from a mixture of methanol and water there is obtained in moderate yield salicoyl-glycyl-L-phenyl alanine-methyl ester of the formula

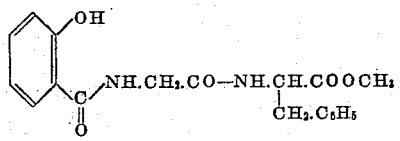

melting at 148–150° C. and having the specific rotation $[\alpha]_D^{24} = +42.5° \pm 1°$ (c. = 1.052 in dioxane).

The starting material is obtained as follows: 2 grams (13.2 millimols) of salicylic acid hydrazide are dissolved in 14 cc. of 1 N-HNO$_3$ and 20 cc. of water, 14 cc. of 1 N-NaNO$_2$-solution are added at 0° C., the whole is stirred for 30 minutes, suction-filtered and washed with cold water. The azide is added with stirring to a solution of 4.4 grams (26.4 millimols) of L-phenyl alanine in 26.4 cc. of 1 N-NaOH and 20 cc. of water, whereupon another 17 cc. of 1 N-NaOH are added. After 2½ hours solution is complete. The mixture is extracted with ethyl acetate, the aqueous solution is acidified with hydrochloric acid of 20% strength and the precipitate is taken up in ethyl acetate. Working up in the customary manner yields 2.73 grams (73% of the theoretical yield) of salicoyl-L-phenyl-alanine as a colourless oil which crystallizes on being scratched with a glass rod. Crystals from a mixture of benzene and a little petroleum ether melt at 117–118° C.

1 gram of salicoyl-L-phenyl-alanine is dissolved in 50 cc. of anhydrous methanol, saturated with HCl gas and allowed to stand overnight. Working up in the usual manner yields 1 gram of oily salicoyl-L-phenyl-alanine-methyl ester.

350 mg. (1.17 millimols) of salicoyl-L-phenyl-alanine-methyl-ester are acylated with 320 mg. (1.4 millimols) of carbobenzoxy-glycyl chloride (M. Bergmann, L. Zervas, Ber. 65, 1195 (1932)) according to the method described in Example 1. 496 mg. of FeCl$_3$-negative oily O-(carbobenzoxy-glycyl)-salicoyl-L-phenyl alanine-methyl ester are obtained.

Hydrogenolysis of the carbobenzoxy compound according to the process of Example 1 yields 443 mg. of oily O-glycyl-salicoyl-L-phenyl alanine-methyl ester perchlorate which is subjected to rearrangement without any further purification.

EXAMPLE 7

1.23 grams of the perchlorate of O-(glycyl)-salicoyl-DL-phenyl-alanyl-glycine-methyl ester of the formula

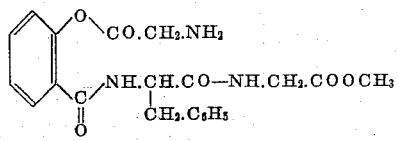

are dissolved in 120 cc. of methanol. 0.32 cc. (corresponding to 0.95 equivalents) of triethylamine is added immediately, the mixture is agitated overnight at 20° C., 5 cc. of 2 N-sulphuric acid are added, the solution is concentrated, taken up in ethyl acetate and 2 N-sulphuric acid, separated, the ethyl acetate is washed with 2 N-sulphuric acid, then with 10% potassium hydrogen carbonate and water alternately, finally with water, dried and evaporated to dryness under reduced pressure. There remains 0.94 gram (95% of the theoretical yield) of a colourless oil which crystallizes from methanol and then melts at 157–158° C. The product is salicoyl-glycyl-DL-phenyl-alanyl-glycine-methyl ester of the formula

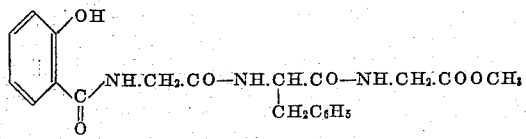

The perchlorate used as starting material can be prepared as follows:

Salicoyl-DL-phenyl alanyl-glycine-methyl ester can be prepared as described in Example 1.

Carbobenzoxy-glycyl chloride (M. Bergmann, L. Zervas, Ber. 65, 1195, 1932) from 2.1 grams (10 millimols) of carbobenzoxy-glycine are suspended in 25 cc. of ether and cooled to −70°. A mixture of 10 cc. of pyridine and 1.4 cc. (10 millimols) of triethylamine cooled to −15° C. is run in while stirring briskly, the temperature not rising above −60° C. A solution of 2.1 grams (5.9 millimols) of salicoyl-DL-phenyl alanyl-glycine-methyl ester in tetrahydrofuran is then added dropwise, whereby a powdery white precipitate is formed. The mixture is heated to −15° C. and allowed to stand overnight at that temperature. Pyridine and tetrahydrofuran are removed under reduced pressure, the remainder is taken up in 2 N-hydrochloric acid and ethyl acetate, washed with 2 N-hydrochloric acid, 10% KHCO$_3$-solution, then with 2 N-sodium carbonate solution and water alternately, finally with water, dried over sodium sulphate and evaporated under reduced pressure. 3 grams of a colourless residue (91% of the theoretical yield) are obtained which however, can only be purified by being recrystallized several times from a mixture of chloroform and ether. There is obtained the analytically pure O-(carbobenzoxy-glycyl)-salicoyl-DL-phenyl alanyl-glycine-methyl ester melting at 141.5–143.5° C. in the form of fine needles.

725 mg. (1.33 millimols) of O-(carbobenzoxy-glycyl)-salicoyl-DL-phenyl alanyl-glycine-methyl ester are subjected to hydrogenolysis in 25 cc. of glacial acetic acid in the presence of 1.33 cc. of 1 N-perchloric acid in acetic acid and 300 mg. of 10% palladium carbon. When the reaction is complete, the carbon is filtered off and the filtrate is evaporated under reduced pressure at 40° C. bath temperature. The residue crystallizes from a mixture of glacial acetic acid and ether. O-(glycyl)-salicoyl-DL-phenyl alanyl-glycine-methyl ester perchlorate is obtained in the form of fine needles melting at 184° C. (with decomposition). On recrystallization from a mixture of glacial acetic acid and ether for the purpose of purification and analysis the melting point falls to 180° C. (with decomposition).

EXAMPLE 8

1 gram of O-(glycyl)-salicoyl-DL-phenyl alanyl-glycine-methyl ester perchlorate is suspended in 100 cc. of chloroform or tetrahydrofuran, the suspension is mixed with an equivalent of triethylamine and allowed to stand for 12 hours at 20° C. The mixture is concentrated, taken up in ethyl acetate and 2 N-hydrochloric acid etc. and yields in addition to glycine and salicoyl-DL-phenyl alanyl-glycine-methyl ester the above described salicoyl-glycyl-DL-phenyl-alanyl-glycine-methyl ester.

EXAMPLE 9

By proceeding in the same manner as described in Example 8 but using 3 equivalents of triethylamine, there is obtained salicoyl-tripeptide ester in pure form.

EXAMPLE 10

1 gram of perchlorate of O-(glycyl)-salicoyl-L-phenyl alanyl-glycine-methyl ester (formula as in Example 7) is treated with 3 equivalents of triethylamine in the manner described in Examples 8 and 9, salicoyl-glycyl-L-phenyl alanyl-glycine-methyl ester being obtained in theoretical yield. The product crystallizes as a monohydrate from a mixture of methanol and water and melt at 92–93° C. and has the specific rotation $[\alpha]_D^{24} = -16.7° \pm 2°$ (c.=1.02 in dioxane). For the formula cf. Example 7.

The perchlorate used as starting material can be prepared by the method described for the DL-form in Example 7. O-(carbobenzoxy-glycyl)-salicoyl-L-phenyl analyl-glycine methyl ester: crystals from a mixture of ethyl acetate and petroleum ether melting at 157–159° C. O-glycyl-salicoyl-L-phenyl alanyl-glycine-methyl ester perchlorate: microcrystalline powder melting at 110–120° C. (with decomposition) after trituration with chloroform. This perchlorate must be used in this form.

EXAMPLE 11

1 gram of perchlorate of O-(DL-phenyl-alanyl)-salicoyl-DL-phenyl alanyl-glycine-methyl ester of the formula

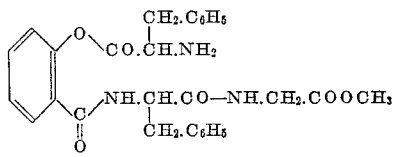

is (a) dissolved in 100 cc. of a 2 N-solution of triethylamine in chloroform or phenol and the resulting solution is allowed to stand for 14 hours at 21° C.; (b) suspended in 100 cc. of methanol or chloroform or tetrahydrofuran, the suspension is mixed with 3 equivalents of triethylamine and allowed to stand for 14 hours at 21° C.; (c) suspended in 80 to 100 cc. of chloroform or tetrahydrofuran, the suspension is mixed with 1 equivalent of triethylamine and kept overnight at room temperature; (d) suspended in 80 to 100 cc. of chloroform or tetrahydrofuran, the suspension is mixed with 0.95 equivalent of triethylamine and kept overnight at room temperature; (e) dissolved in 100 cc. of anhydrous pyridine and the solution allowed to stand overnight at 21° C.

In each case there is obtained salicoyl-DL-phenyl alanyl-DL-phenyl alanyl-glycine-methyl ester of the formula

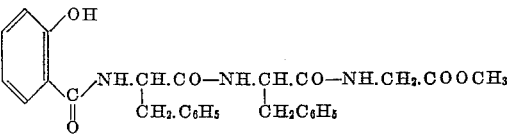

It crystallizes from methanol and a little water and melts at 181–184° C.

The perchlorate of O-(DL-phenyl alanyl)-salicoyl-DL-phenyl alanyl-glycine-methyl ester used as starting material can be prepared as follows:

0.299 gram of carbobenzoxy-DL-phenyl-alanine (1 millimol) is converted into the chloride as described in Example 1 and reacted with 450 mg. (1.25 millimols) of salicoyl-DL-phenyl alanyl-glycine-methyl ester in 2 cc. of pyridine. Working up is carried out in the same way as described in Example 1. The resulting O-(carbobenzoxy-DL-phenyl alanyl)-salicoyl-DL-phenyl alanyl-glycine-methyl ester is an oily diastereomeric mixture. Hydrogenolysis carried out as described in Example 1 yields in quantitative yield a partially crystalline mixture of stereoisomeric perchlorates of O-(DL-phenyl alanyl-salicoyl-DL-phenyl alanyl-glycine-methyl ester which is used directly in this form.

EXAMPLE 12

1 gram of hydroiodide of S-(DL-phenyl-alanyl)-thiosalicoyl-glycine-anilide (melting point=190–196° C. with decomposition) of the formula

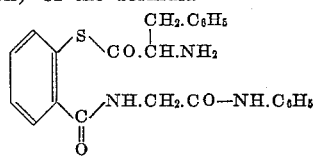

is suspended in 100 cc. of chloroform, the suspension is mixed with 3 equivalents of triethylamine and kept for 12 hours at 22° C. There is obtained thiosalicoyl-DL-phenyl alanyl-glycine anilide of the formula

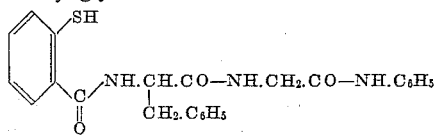

The hydroiodide used as starting material can be prepared as follows:

1 gram (2.91 millimols) of disulphide-dichloride of thiosalicyclic acid (Hilditch, J. Chem. Soc., 99, 1099 (1911)) and 1.50 grams (10 millimols) of glycine anilide (Hill, Kelsey, J. Am. Chem. Soc. 42, 1706) in 10 cc. of tetrahydrofuran are mixed with 10 cc. of pyridine at 0° C. and allowed to stand for 14 hours at 0° C. After evaporating under reduced pressure, distribution between ethyl acetate and hydrochloric acid, then extraction of the ethyl acetate solution with bicarbonate solution and evaporation of the ethyl acetate under reduced pressure, the crude disulphide of thiosalicoyl-glycine anilide is isolated: crystals from a mixture of glacial acetic acid and water melting at 208–210° C., yield 1 gram (61% of the theoretical yield).

1 gram (1.75 millimols) of disulphide is suspended in 100 cc. of ethanol and 20 cc. of water. The boiling suspension is mixed with 2 grams of zinc dust and 20 cc. of 2 N-hydrochloric acid are added slowly, the operation being carried out in a nitrogen or carbon dioxide atmosphere. When dissolution is complete, 200 cc. of water are added while the reaction mass is still hot and the whole is allowed to stand for 14 hours at 0° C. The precipitated crystals of thiosalicoyl-glycine anilide are filtered off, dried and recrystallized from a mixture of ethyl acetate and benzine. Melting point 177–179° C., yield 860 mg. (86% of the theoretical yield).

600 mg. (2 millimols) of carbobenzoxy-DL-phenyl alanine are converted into the acid chloride as described in Example 1 and reacted in 10 cc. of pyridine with 286 mg. of thiosalicoyl glycine anilide (1 millimol). After evaporating the pyridine under reduced pressure, the residue is distributed between ethyl acetate and hydrochloric acid, the ethyl acetate solution is extracted exhaustively with bicarbonate solution, washed neutral, dried and evaporated under reduced pressure. After recrystallization from a mixture of methanol and a little water there are obtained 350 mg. (62% of the theoretical yield) of S-(corbobenzoxy-DL-phenyl alanyl)-thiosalicoyl-glycine anilide melting at 149° C.

400 mg. of S-(carbobenzoxy-DL-phenyl alanyl)-thiosalicoyl-glycine anilide (0.71 millimol) are dissolved in 20 cc. of glacial acetic acid and treated with 500 mg. of phosphonium iodide for 3 hours at 60° C. bath temperature. After filtering off the unconsumed phosphonium iodide, the glacial acetic acid is removed under reduced pressure and the spontaneously crystallizing residue is recrystallized from a mixture of glacial acetic acid and a little petroleum ether. There are obtained 200 mg. (50% of the theoretical yield) of S-(DL-phenyl alanyl)-thiosalicoyl-glycine anilide hydroiodide melting at 190–196° C. (with decomposition), with sintering from 176° C.

The cleavage of the N-acyl group in the compounds obtained as described in the above examples can be carried out as follows:

I. DL-phenyl alanyl-glycine (1) SALICOYL-DL-PHENYL ALANYL-GLYCINE 100 mg. (0.28 millimol) of salicoyl-DL-phenyl alanyl-glycine-methyl ester, obtained as described in Example 1, are dissolved in 1.2 cc. of 0.5 N-NaOH (0.6 millimol) and allowed to stand for 15 hours at room temperature. The solution is acidified with 2 N-hydrochloric acid, extracted with ethyl acetate, the latter is washed neutral, dried, evaporated under reduced pressure and salicoyl-DL-phenyl alanyl-glycine is obtained in a yield of 85 mg. (90% of the theoretical yield) in the form of a colourless foam; crystals can be isolated from a mixture of alcohol and water melting at 212–214° C.

(2) O-METHYL-SALICOYL-DL-PHENYL ALANYL-GLYCINE 535 mg. (1.5 millimols) of salicoyl-DL-phenyl-alanyl-glycine-methyl ester are dissolved in 12 cc. of dioxane and mixed with 5 millimols of diazo-methane in ether. After standing for 6 hours, the solution which is still yellow is evaporated to dryness under reduced pressure, and the residue is hydrolysed directly with 1.8 cc. of 1 N-NaOH in 10 cc. of acetone. After two hours, the reaction mass is acidified, the acetone is removed under reduced pressure, the precipitate is taken up in ethyl acetate solution, is washed neutral, dried and evaporated to dryness. There are obtained 360 mg. (67% of the theoretical yield) of O-methyl-salicoyl-DL-phenyl alanyl-glycine which is worked up directly.

(3) TREATMENT WITH Na IN LIQUID NH₃

(a) 3.42 grams (10 millimols) of salicoyl-DL-phenyl alanyl-glycine or 3.56 grams (10 millimols) of O-methyl-salicoyl-DL-phenyl alanyl-glycine are dissolved in 70 cc. of liquid ammonia and 1.84 grams of sodium are added. When all the sodium has been consumed, the ammonia is evaporated and the residue is taken up in 50 cc. of 2 N-hydrochloric acid. After extracting with ethyl acetate, the acid aqueous solution is evaporated to dryness, the residue is taken up in absolute alcohol, filtered and the alcohol evaporated under reduced pressure. The residue consists of DL-phenyl-alanyl-glycine hydrochloride.

(b) The same procedure is used as in (a) using 0.92 gram of sodium.

(c) The same procedure is used as in (a) using 0.46 gram of sodium.

II. Glycyl-DL-phenyl alanyl-glycine (1) SALICOYL-GLYCYL-DL-PHENYL ALANYL-GLYCINE 413 mg. (1 millimol) of salicoyl-glycyl-DL-phenyl alanyl-glycine-methyl ester from Example 7 are dissolved in 6 cc. of 0.5 N-NaOH and allowed to stand for 16 hours at 20° C. After acidifying the reaction mixture, it is extracted with ethyl acetate, the latter is washed neutral, dried and evaporated under reduced pressure. There are obtained 330 mg. (83% of the theoretical yield) of a colourless crystalline residue which is recrystallized from a mixture of alcohol and water; melting point=203–205° C.

(2) TREATMENT WITH SODIUM IN LIQUID AMMONIA 1 gram of salicoyl-glycyl-DL-phenyl-alanyl-glycine (2.5 millimols) is dissolved in 20 cc. of liquid ammonia and 0.46 gram of sodium is added. When all the sodium is consumed, the ammonia is evaporated and the residue taken up in water. After adjusting the pH value to 6–7 with an acid ion exchanger (Amberlite IR 120), filtering and extracting with ethyl acetate, the aqueous solution is evaporated to dryness and from the residue there is obtained glycyl-DL-phenyl-alanyl-glycine.

What is claimed is:

1. Process for the manufacture of peptides, consisting in treating an o-phenylene-carboxylic acid amide the carbonyl group of which is connected with the radical of a natural amino acid, and the substituent of which in the ortho-position is a member of the group consisting of the residues —O—CO—R—NH₂ and —S—CO—R—NH₂ in which residues R stands for the divalent radical of a natural amino carboxylic acid, with a basic agent.

2. Process as claimed in claim 1, wherein a carboxylic acid amide of salicyclic acid is used.

3. Process as claimed in claim 1, wherein a carboxylic acid amide of thiosalicyclic acid is used.

4. Process as claimed in claim 1, wherein alkali hydroxide is used as basic agent.

5. Process as claimed in claim 1, wherein a tertiary organic base is used as basic agent.

6. Process as claimed in claim 1, wherein triethylamine is used as basic agent.

7. An o-phenylene-carboxylic acid amide the carbonyl group of which is connected with the radical of a natural amino acid, and the substituent of which in the ortho-position is a member of the group consisting of the residues —O—CO—R—NH₂ and —S—CO—R—NH₂ in which residues R stands for the divalent radical of a natural amino carboxylic acid.

8. An o-phenylene-carboxylic acid amide the carbonyl group of which is connected with a chain of at least two radicals of natural amino acids and which contains in the ortho-position a member of the group consisting of the radicals —OH and —SH.

9. A compound of the formula

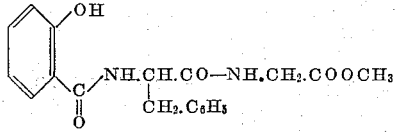

10. A compound of the formula

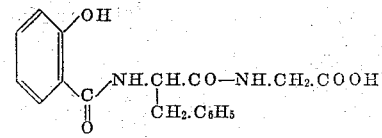

11. A compound of the formula

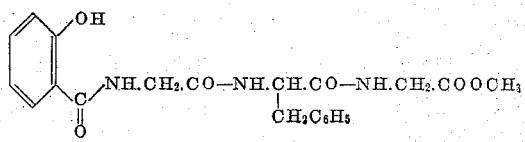

12. A compound of the formula
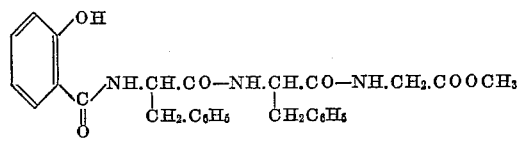
13. A compound of the formula
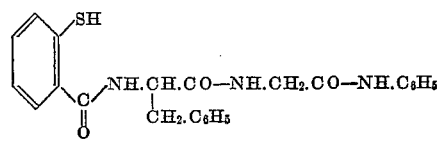
No references cited.

UNITED STATES PATENT OFFICE
CERTIFICATE OF CORRECTION

Patent No. 2,850,491 September 2, 1958

Max Brenner

It is hereby certified that error appears in the printed specification of the above numbered patent requiring correction and that the said Letters Patent should read as corrected below.

Column 2, line 3, for "remeove" read -- remove --; column 8, line 53, for "cooled to -70°." read -- cooled to -70° C. --; column 9, line 39, for "melt" read -- melts --; column 11, line 12, for "S-(corbobenzoxy-" read -- S-(carbobenzoxy- --.

Signed and sealed this 9th day of December 1958.

(SEAL)
Attest:

KARL H. AXLINE
Attesting Officer

ROBERT C. WATSON
Commissioner of Patents